(12) United States Patent
Kim

(10) Patent No.: US 8,896,177 B2
(45) Date of Patent: Nov. 25, 2014

(54) INTERIOR PERMANENT MAGNET MOTOR AND MANUFACTURING METHOD FOR THE SAME

(75) Inventor: Myunggyu Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 380 days.

(21) Appl. No.: 13/172,501

(22) Filed: Jun. 29, 2011

(65) Prior Publication Data

US 2012/0139377 A1 Jun. 7, 2012

(30) Foreign Application Priority Data

Dec. 1, 2010 (KR) .................. 10-2010-0121636

(51) Int. Cl.
H02K 1/04 (2006.01)
H02K 21/12 (2006.01)
H02K 1/27 (2006.01)
H02K 15/03 (2006.01)

(52) U.S. Cl.
CPC .............. H02K 1/276 (2013.01); H02K 15/03 (2013.01)
USPC ............ 310/156.53; 310/156.22; 310/156.56; 310/156.21; 310/43; 29/598

(58) Field of Classification Search
USPC ............ 310/156.21, 156.53, 156.22, 156.78, 310/156.79, 156.82, 156.56; 29/596–598
See application file for complete search history.

(56) References Cited

U.S. PATENT DOCUMENTS

2008/0238219 A1 * 10/2008 Hoshino et al. ................. 310/42
2009/0174273 A1 * 7/2009 Watanabe et al. ........ 310/156.53

FOREIGN PATENT DOCUMENTS

| JP | 2001-352702 A | | 12/2001 | |
|---|---|---|---|---|
| JP | 2005-051826 A | | 2/2005 | |
| JP | 2005051826 A | * | 2/2005 | .............. H02K 1/27 |
| JP | 2005312259 A | * | 11/2005 | ............. H02K 15/03 |
| JP | 2006238559 A | * | 9/2006 | |
| JP | 2008-022587 A | | 1/2008 | |
| JP | 2009-038906 A | | 2/2009 | |
| KR | 10-2009-0053475 A | | 5/2009 | |

OTHER PUBLICATIONS

JP 2005051826 A, machine translation Sep. 7, 2013.*
JP 2005312259 A, machine translation Sep. 7, 2013.*
JP 2006238559 A, machine translation Sep. 7, 2013.*

* cited by examiner

Primary Examiner — Tran Nguyen
Assistant Examiner — Leda Pham
(74) Attorney, Agent, or Firm — Edwards Wildman Palmer LLP; Peter F. Corless

(57) ABSTRACT

An interior permanent magnet motor in provided which is made up of a permanent magnet, and a rotor core of which an insertion aperture for the permanent magnet to be inserted thereinto is formed in the rotor core. Additionally, the interior permanent magnet motor includes a first end plate which is connected to the rotor core and of which a first seating portion for the permanent magnet is disposed thereto is formed in the first seating portion and a second end plate which is connected to the rotor core and of which a second seating portion for the permanent magnet is disposed thereto is formed in the second end plate.

4 Claims, 6 Drawing Sheets

INTERIOR PERMANENT MAGNET MOTOR AND MANUFACTURING METHOD FOR THE SAME

CROSS-REFERENCE TO RELATED APPLICATION

This application claims priority to and the benefit of Korean Patent Application No. 10-2010-0121636 filed in the Korean Intellectual Property Office on Dec. 1, 2010, the entire contents of which are incorporated herein by reference.

BACKGROUND OF THE INVENTION (a) Field of the Invention

The present invention relates to a motor. More particularly, the present invention relates to an interior permanent magnet motor and manufacturing method for the same.

(b) Description of the Related Art

Generally, a interior permanent magnet (IPM) motors have emerged in recent years as a very strong contender to replace induction motors used in electronically controlled variable speed applications. In most cases, IPM motors can provide superior performance in terms of increased efficiency, improved torque output and reduced noise and thus they are a great candidate for application in a HEV (Hybrid Electric Vehicle).

IPM motors are wound similarly to the induction motors found in a typical home, but (for high efficiency) they use very strong rare earth magnets in the rotor. These magnets contain neodymium, iron and boron, and are therefore called Neodymium magnets. Along with being highly efficient, IPM motors may also supply an increased amount of torque and thus, they are ideal for use in HEV vehicles.

However, because IPM motors are used for a HEV drive motor which is utilized for, e.g., driving an HEV vehicle forward and backward, repeated engagement with an engine clutch and so on, the construction of the permanent magnet within the IPM motor is considerably important.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides an interior permanent magnet motor and manufacturing method for the same which optimizes the arraying of permanent magnets and fixing strength.

An interior permanent magnet motor according to an exemplary embodiment of the present invention may include a permanent magnet, a rotor core of which an insertion aperture for the permanent magnet to be inserted thereinto is formed thereto, a first end plate which is connected to the rotor core and of which a first seating portion for the permanent magnet is disposed thereto is formed thereto and a second end plate which is connected to the rotor core and of which a second seating portion for the permanent magnet is disposed thereto and is formed thereto.

In some embodiments of the present invention, the first seating portion and the second seating portion may include slant portions shaped as a wedge and a channel may be formed into the slant portion. Further, a reservoir which is communicated with the first seating portion and of which adhesive is filled therein may be formed to the first end plate and a resin inlet for filling resin into the first seating portion may be formed to the first end plate.

Additionally, a manufacturing method for an interior permanent magnet motor according to the first exemplary embodiment of the present invention may include filling adhesive into a reservoir communicated with a first seating portion formed to a first end plate, inserting a permanent magnet into a rotor core, connecting the first end plate and the rotor core, connecting a second end plate of which a second seating portion is formed thereto and the rotor core and applying the adhesive by turning the interior permanent magnet motor upside down.

A manufacturing method for an interior permanent magnet motor according to the second exemplary embodiment of the present invention may include inserting a permanent magnet into a rotor core, connecting the rotor core to a first end plate of which a first seating portion and a resin inlet communicated with the first seating portion are formed thereto, connecting the rotor core to a second end plate of which a second seating portion is formed thereto and filling resin into the resin inlet.

According to various exemplary embodiments of the present invention, the interior permanent magnet motor and the manufacturing for the same may optimize arraying of permanent magnets and fixing strength by utilizing a wedge effect and securing a space for adhesive or resin. Additionally, the interior permanent magnet motor is uniformly filled with adhesive or resin and thus stably fixes permanent magnets therein.

BRIEF DESCRIPTION OF THE DRAWINGS

The above and other features of the present invention will now be described in detail with reference to certain exemplary embodiments thereof illustrated the accompanying drawing which is given hereinbelow by way of illustration only, and thus are not limitative of the present invention, and wherein.

DESCRIPTION OF SYMBOLS

Figure 1:
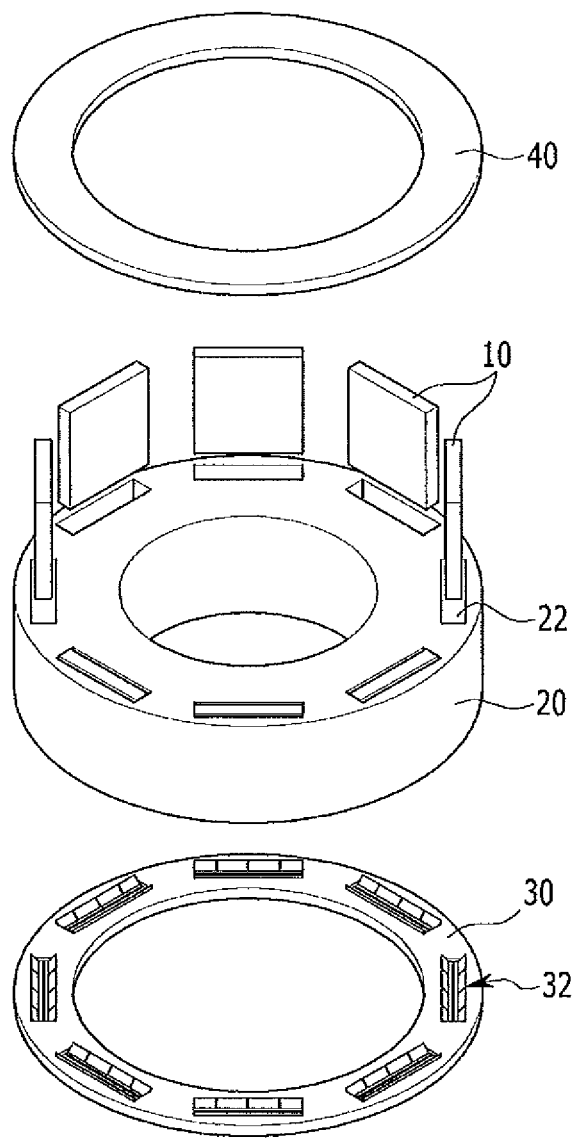
FIG. 1 is an exploded perspective view of an interior permanent magnet motor according to the first exemplary embodiment of the present invention.

10: permanent magnet
20: rotor core
22: insertion aperture
30: first end plate
32: first seating portion
34, slant portion 36: channel
40: second end plate
42: the second seating portion
50: reservoir
60: resin inlet

DETAILED DESCRIPTION OF THE EMBODIMENTS

Exemplary embodiments of the present invention will hereinafter be described in detail with reference to the accompanying drawings.

Note that it is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 2:
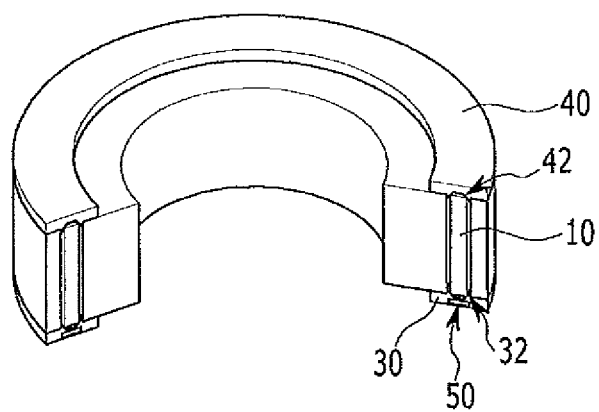
FIG. 2 is a partial cross-sectional view of an interior permanent magnet motor according to the first exemplary embodiment of the present invention.

FIG. 1 is an exploded perspective view of an interior permanent magnet motor according to the first exemplary embodiment of the present invention, and FIG. 2 is a partial cross-sectional view of an interior permanent magnet motor according to the first exemplary embodiment of the present invention.

Figure 3:
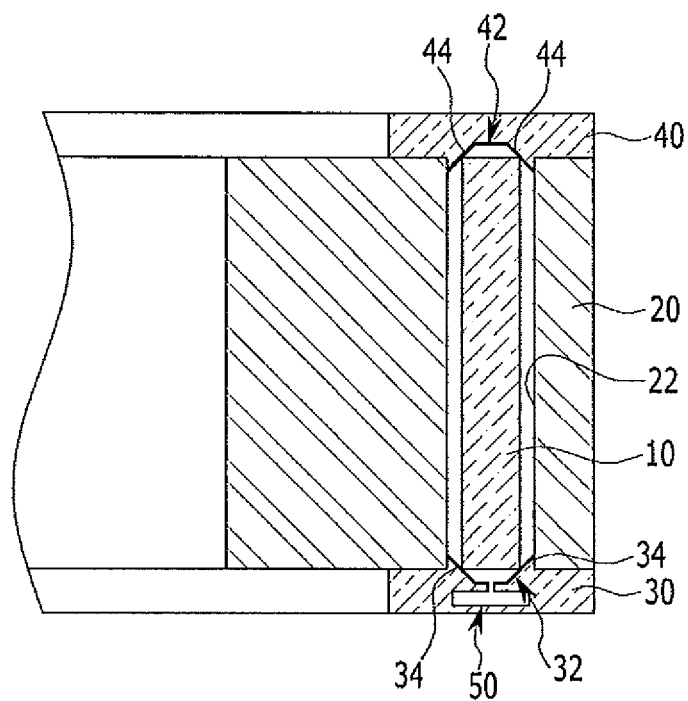
FIG. 3 is an enlarged cross-sectional view of an interior permanent magnet motor according to the first exemplary embodiment of the present invention.
Figure 4:
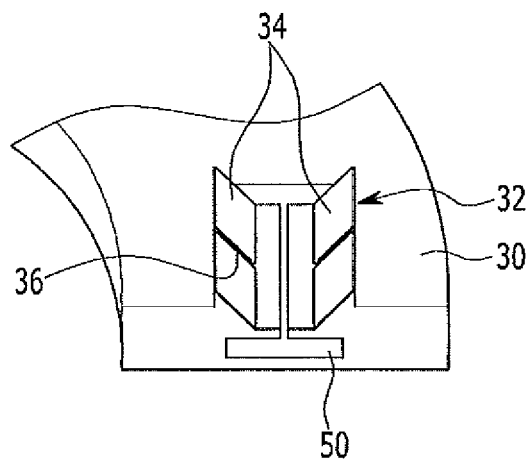
FIG. 4 is a cross-sectional perspective view of a slant portion of an interior permanent magnet motor according to the first exemplary embodiment of the present invention.

FIG. 3 is an enlarged cross-sectional view of an interior permanent magnet motor according to the first exemplary embodiment of the present invention, and FIG. 4 is a cross-sectional perspective view of a slant portion of an interior permanent magnet motor according to the first exemplary embodiment of the present invention.

Referring to FIG. 1 to FIG. 4, an interior permanent magnet (IPM) motor according to the first exemplary embodiment of the present invention includes a plurality of permanent magnets 10, a rotor core 20 of which a plurality of insertion apertures 22 for the each of the permanent magnets 10 to be inserted thereinto are formed in the rotor core 20, a first end plate 30 which is connected to the rotor core 20 and of which a plurality of first seating portions 32 for the permanent magnets 10 are disposed thereto are formed in the first end plate 30 and a second end plate 40 which is connected to the rotor core 20 and of which a plurality of second seating portions 42 for the permanent magnets 10 are disposed thereto are formed in the second end plate 40.

In particular, the first seating portions 32 and the second seating portions 42 may be embodied as slanted portions 32 and 34 shaped as a wedge. The slanted portions 34 and 44 are thereby configured to arrange the permanent magnets 10 within the insertion aperture 22 stably and uniformly. Accordingly, a channel 36 is formed to the slanted portions 34 and 44. However, although the channel formed by the slanted portions 44 of the second end plate 40 is not shown in the drawings, it is the same channel as the channel 36 shown in FIG. 4 from slanted portions 32.

A reservoir 50 which is communicated with the first seating portion 32 is filled with adhesive therein and is preferably formed in the first end plate 30.

The reservoir 50 is filled with the adhesive in advance, and then the motor is assembled. After assembling the interior permanent magnet motor, the interior permanent magnet motor is turned upside down so that the adhesive is applied and hardened. Since extra adhesive remains in the reservoir 50, leaked adhesive may be minimized and the adhesive may be uniformly supplied due to the channel 36 of the slant portions 34 and 44.

The separated adhesive reservoir 50 is applied and thus the permanent magnet 10 may be safely and precisely disposed to the first and second end plate 30 and 40 without resistance of the adhesive. Also, due to the wedge effect of the slanted portions 34 and 44, positions of the permanent magnets 10 may be precisely arranged in the insertion apertures 22 and simultaneously provides a space for spreading the adhesive.

Figure 5:
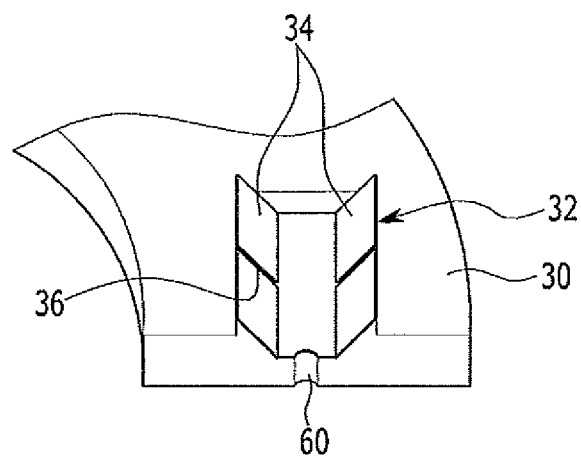
FIG. 5 is a cross-sectional perspective view of a slant portion of an interior permanent magnet motor according to the second exemplary embodiment of the present invention.

FIG. 5 is a cross-sectional perspective view of a slanted portion of an interior permanent magnet motor according to the second exemplary embodiment of the present invention. Hereinafter, referring to FIG. 5, an interior permanent magnet motor according to the second exemplary embodiment of the present invention will be described.

The components of the embodiment shown in FIG. 5 are different from those of the embodiment shown in FIG. 1 to FIG. 4 only in the points of the reservoir and thus similar components are indicated with the same reference numerals in FIG. 1 to FIG. 4 and repeated description will be omitted.

In interior permanent magnet motor according to the second exemplary embodiment of the present invention, a resin inlet 60 is formed at the first end plate 30 for filling resin into the first seating portion 32. In the second exemplary embodiment of the present invention, after assembling the interior permanent magnet motor, the resin is inserted into through the resin inlet 60 and hardened.

As in the first exemplary embodiment of the present invention, in the second exemplary embodiment of the present invention the resin may be uniformly supplied due to the channel 36 of the slant portions 34 and 44. Also, due to wedge effect of the slanted portions 34 and 44, positions of the permanent magnets 10 may be precisely arranged in the insertion aperture 22 and simultaneously provides a space for spreading the resin.

Figure 6:
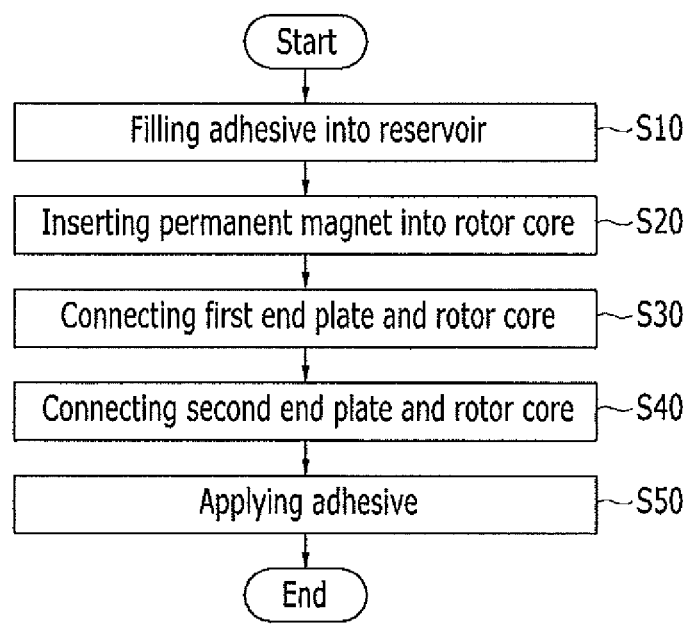
FIG. 6 is a flowchart of a manufacturing method for an interior permanent magnet motor according to the first exemplary embodiment of the present invention.

FIG. 6 is a flowchart of a manufacturing method for an interior permanent magnet motor according to the first exemplary embodiment of the present invention. Hereinafter, referring to FIG. 1 to FIG. 4 and FIG. 6, a manufacturing method for the interior permanent magnet motor according to the first exemplary embodiment of the present invention will be described.

A manufacturing method for an interior permanent magnet motor according to the first exemplary embodiment of the present invention include filling adhesive into a reservoir 50 communicated with a first seating portion 32 formed to a first end plate 30 (S10), inserting a permanent magnet 10 into a rotor core 20 (S20), connecting the first end plate 30 and the rotor core 20 (S30), connecting a second end plate 40 of which a second seating portion 42 is formed thereto and the rotor core 20 (S40) and applying the adhesive by turning the interior permanent magnet motor upside down (S50).

The first seating portion 32 and the second seating portion 42 include slant portions 32 and 34 shaped as a wedge.

A channel 36 is formed to the slant portions 34 and 44

Figure 7:
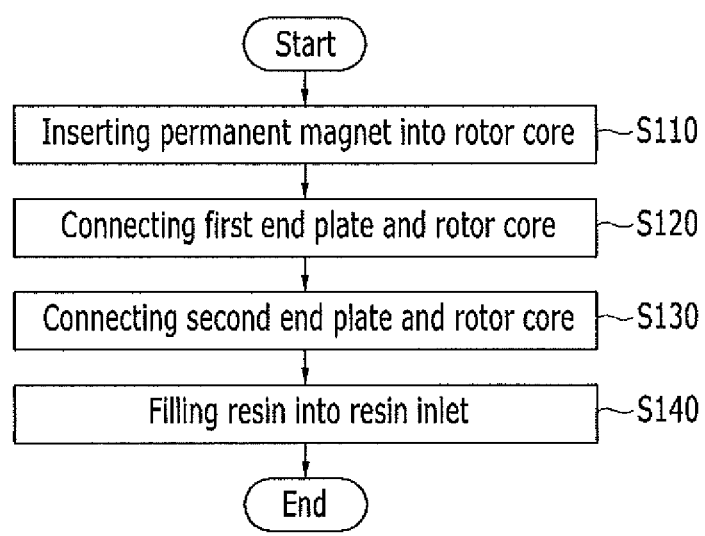
FIG. 7 is a flowchart of a manufacturing method for an interior permanent magnet motor according to the second exemplary embodiment of the present invention.

FIG. 7 is a flowchart of a manufacturing method for an interior permanent magnet motor according to the second exemplary embodiment of the present invention.

Hereinafter, referring to FIG. 1 to FIG. 3, FIG. 5 and FIG. 7, a manufacturing method for the interior permanent magnet motor according to the second exemplary embodiment of the present invention will be described.

A manufacturing method for an interior permanent magnet motor according to the second exemplary embodiment of the present invention illustratively includes inserting a permanent magnet 10 into a rotor core 20 (S110), connecting the rotor core 20 to a first end plate 30 of which a first seating portions 32 and a resin inlet 60 communicated with the first seating portions 32 are formed thereto (S120), connecting the rotor core 20 to a second end plate 40 of which a second seating portion 42 is formed thereto (S130) and filling resin into the resin inlet 60 (S140).

As stated above, the first seating portions 32 and the second seating portions 42 include slanted portions 32 and 34 shaped as a wedge. In doing so, a channel 36 is formed by the slant portions 34 and 44

The manufacturing methods for the interior permanent magnet motor according to the first and second exemplary embodiment of the present invention have the same effect of the interior permanent magnet motor according to the first and second exemplary embodiment and thus repeated description will be omitted.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. An interior permanent magnet motor comprising:
a permanent magnet;
a rotor core including an insertion aperture formed therein, wherein the permanent magnet is inserted into the insertion aperture;
a first end plate fixed to the rotor core, wherein the first end plate includes a first seating portion abutting the permanent magnet;
a second end plate fixed to the rotor core, wherein the second end plate includes a second seating portion abutting the permanent magnet; and
a reservoir formed at least in the first end plate fixed to the rotor core, wherein the reservoir is separated from the permanent magnet, adhesive is filled within the reservoir, and the reservoir includes an inlet disposed to fill adhesive into the reservoir, the inlet formed between the reservoir and the insertion aperture.

2. The interior permanent magnet motor of claim 1, wherein the first seating portion and the second seating portion includes slanted portions shaped as a wedge.

3. The interior permanent magnet motor of claim 2, wherein a channel is formed by the slanted portions.

4. The interior permanent magnet motor of claim 1, wherein the adhesive is a resin.

* * * * *